United States Patent [19]
Staubli et al.

[11] 3,921,455
[45] Nov. 25, 1975

[54] MANOMETER

[75] Inventors: Alfons Staubli, Jegenstorf; Hans Weber, Zollikofen, both of Switzerland

[73] Assignee: Haenni & Cie Aktiengesellschaft, Jegenstorf, Switzerland

[22] Filed: Apr. 2, 1974

[21] Appl. No.: 457,264

[30] Foreign Application Priority Data
Apr. 9, 1973 Switzerland.......................... 5070/73

[52] U.S. Cl. .................................................. 73/418
[51] Int. Cl.² ........................................... G01L 7/04
[58] Field of Search ............ 73/411, 418, 412, 300, 73/432 R, 413, 414, 415, 416, 417, 431

[56] References Cited
UNITED STATES PATENTS
3,141,335  7/1964  Smith................................... 73/416

3,293,917  12/1966  VanderHeyden...................... 73/431
3,701,284  10/1972  DeMeyer............................... 73/416
3,776,041  12/1973  Wetterhorn............................ 73/414

*Primary Examiner*—Donald O. Woodiel
*Attorney, Agent, or Firm*—Stevens, Davis, Miller & Mosher

[57] ABSTRACT

A case of a manometer comprises a cup-shaped case body, the peripheripheral wall of which has an outwardly protruding flattened wall zone surrounding an aperture. Within the case a support-piece carries pressure-measuring- and indicating means and, together with an outer connecting piece fluid-tightly mounted on an outer portion thereof, grips the flat wall portion in a fluid-tight manner.

5 Claims, 3 Drawing Figures

MANOMETER

This invention relates to a manometer comprising a case having a body, a window shield, and fluid-tight connecting means, in which case are disposed a measuring spring in the form of a Bourdon tube or a helically wound spring tube, a pointer mechanism, means for transmitting the variation in shape of the measuring spring to the pointer mechanism, and means within the case for the fluid-tight connection of the measuring spring to connecting means outside the case.

In manometers of the foregoing type, the case with connecting piece customarily consists of a hot-pressed brass blank. Such brass blanks are relatively expensive and, what is more, they are very costly to machine. The measuring spring is disposed within the case, usually in such a way that the case parts themselves come into contact with the pressure medium. The measuring spring may then be soldered to a part of the case. Thus the pressure and measurement system comprises parts of the case, and this makes both the efficient production of components and their assembly more difficult; moreover, because of these brass parts, chemically very active media cannot be measured since they necessitate the use of stainless steel.

It is the object of the present invention to avoid these drawbacks while making it possible to produce particularly the case, the connecting pieces, and the measuring springs of all sorts of metals and with all sorts of surface treatment and consequently to assemble them as prefabricated parts according to the technical requirements of their particular use. It is intended to enable the components to be made for the most part of cheap raw materials such as sheet-metal and bar stock, in addition to enable the use of components of standard manometers.

To this end, in a manometer of the aforementioned type, the case body comprises a surface-treated, cup-shaped, deep-drawn sheet-metal shell, and the connecting means within the case consist of a support piece produced from prismatic bar stock, to which support piece a base plate carrying the pointer mechanism and the transmission means is fastened, said support piece passing at an annular shoulder through an aperture in the cup-shaped case body part and, together with an outer connecting piece screwed thereon from outside, clamping fast a flattened, protruding wall zone of the cup-shaped case body part, said wall zone surrounding the said aperture and being adapted in its contour to the cross-sectional shape of the support piece.

With this arrangement, it becomes possible, for instance, to produce, in manufacture, pre-assemblies comprising the support pieces, pressure measurement means, transmission calibrate means and pointer mechanisms, and then to calibrate such pre-assemblies. These will then constitute complete, self-contained inner units to be inserted into the case bodies and tightly secured to them by means of the outer connecting pieces. In so doing, each complete inner unit will be self-oriented by the engagement of the annular shoulder of the support piece with the protruding wall zone of the case body since a preferably square or rectangular contour of the support piece at the shoulder will fit in the recess formed inwardly of the case at said flattened, protruding wall zone. Damping liquid may be introduced into the cup-shaped case body; the case may be completed by securing a window plate to that body in a fluid-tight manner.

In this way, a manometer is provided which may be filled with damping liquid, which may be used without such filling as a dust-tight and water-tight standard manometer, and which can be efficiently manufactured, extremely economically, with a substantial saving in weight.

Other objects and advantages of the invention will become apparent from the following detailed description of a preferred embodiment thereof, taken in conjunction with the accompanying drawings, in which.

Figure 1:
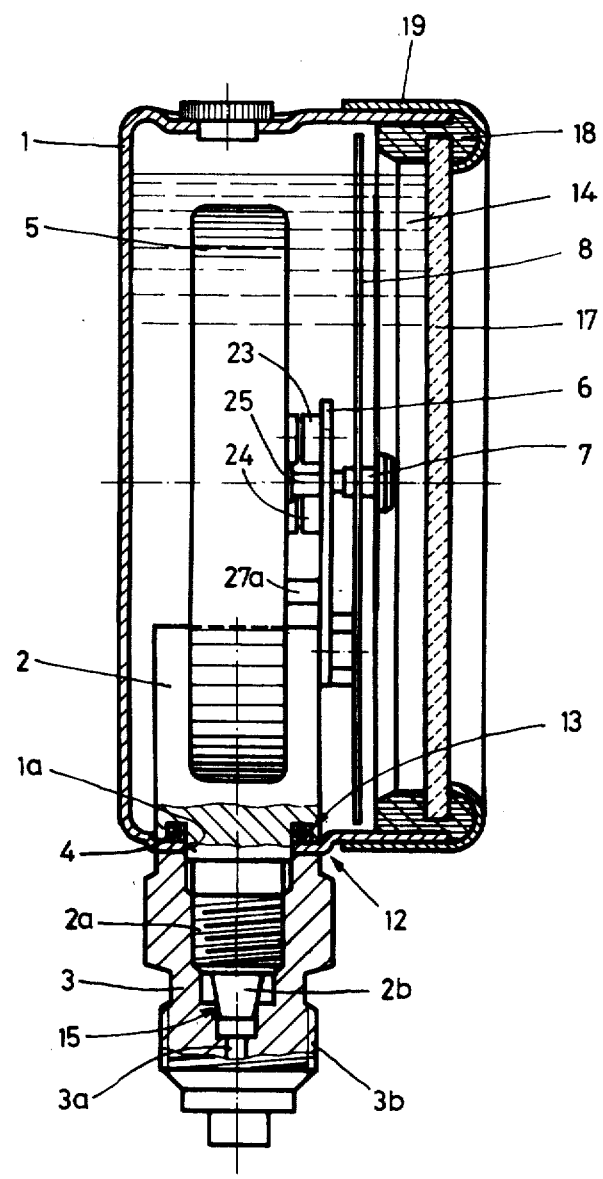
FIG. 1 is a section through the manometer.
Figure 2:
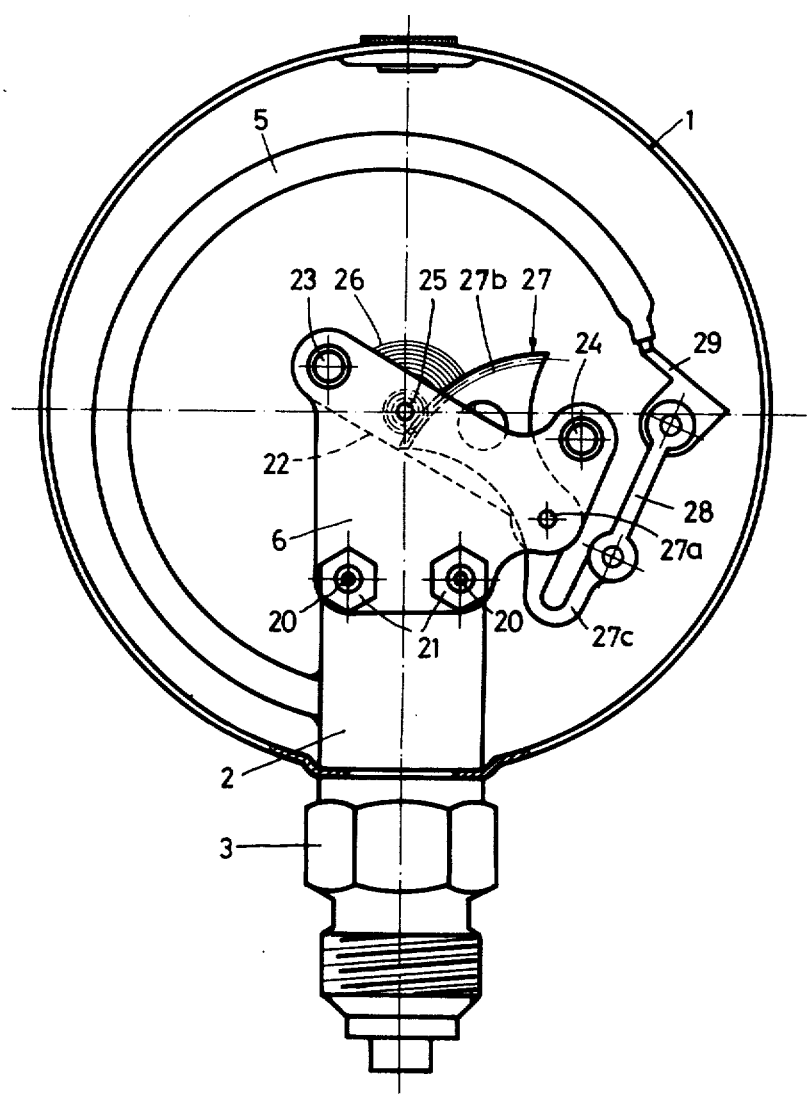
FIG. 2 is a top plan view.
Figure 3:
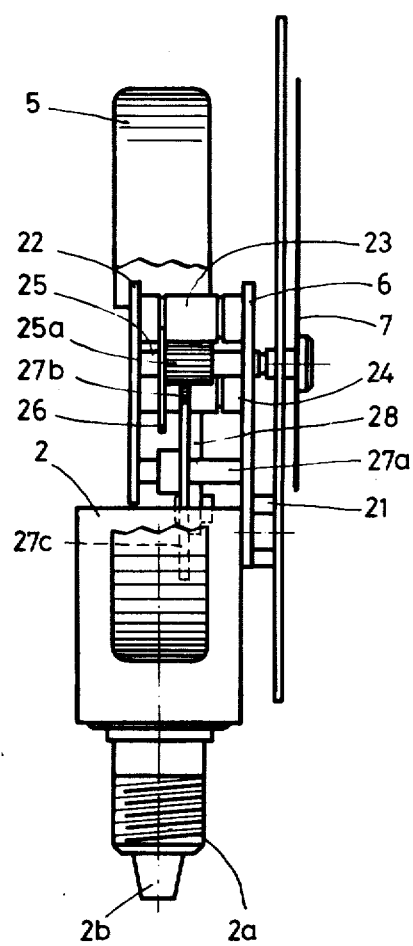
FIG. 3 shows the complete inner unit, a portion of a pressure measurement Bourdon tube being broken away to make visible parts of a pointer mechanism and of a notion transmitting device operatively connecting it with the free end of the Bourdon tube.

A case body 1 consists of a deep-drawn shell, there being stamped into it at an aperture 1a a square, flattened outwardly protruding wall zone 12, which blocks a support piece 2 against twisting and consequently fixes the desired position of the complete unit as shown in FIG. 3 with respect to the case.

An outer connecting piece 3 has an internal thread to which the support piece 2, having an external thread, is screwed. An O-ring 4, which is clamped in between case body 1 and support piece 2, prevents leakage of a damping liquid 14. Support piece 2 is provided with a groove 13 for receiving O-ring 4; also fastened to this support piece 2 are a measuring spring 5 and a base plate 6 of a pointer mechanism to which belong a pointer 7 and a dial 8.

The measuring spring 5 is constituted by a well-known Bourdond tube, the inner space of which communicates with a bore 3a of the outer connecting piece 3 via a bore (not shown) provided in the support piece 2, which thus also constitutes an inner connecting piece.

The pointer mechanism and a transmission mechanism operatively connecting it with the free end of the measuring spring 5 are well known per se.

The base plate 6 is secured to the support piece 2 by means of two studs 20 anchored in that piece 2 and also by means of nuts 21 screwed on these studs, the outer ends of which are riveted to secure the dial 8. An auxiliary base plate 22 is rigidly connected to base plate 6 by means of bolts 23, 24. The pointer 7 is fixed to a spindle 25 mounted on the plates 6, 22. This spindle is biased as usual by a very weak, spirally-wound return spring 26, and it has a portion 25a constituting a pinion. A transmission lever part 27 has an axle 27a mounted on the plates 6, 22; it also has a toothed portion 27b meshing with the pinion 25a and a portion 27c which, by means of a link 28, is operatively connected to a part 29. This part 29 is secured in a fluid-tight manner, for instance by soldering, to the free end of the Bourdon tube constituting the measuring spring 5.

Support piece 2 is provided with an intermediate threaded portion 2a and a conical extension 2b which, when the outer connecting piece 3 is screwed tight, embeds itself in a sealing rim 15 of outer connecting piece 3 for the purpose of sealing in the pressure medium.

Support piece 2 and outer connecting piece 3 may be secured against loosening by means of an adhesive or by soldering, for instance in the screw connection including portion 2a. The outer connecting piece may be provided with any conventional standard connection thread at 3b.

The complete inner unit, which consists of the support piece 2 and of the parts carried by that piece as shown in FIG. 3, may be inserted as a whole into case body 1 and fastened by screwing the outer connecting piece 3 tightly onto the portion 2a of the support piece 2.

Case body 1 is provided on the dial side with a window shield 17, a rubber gasket 18, and a snap-on or screw-on bezel 19, which prevent leakage of the damping liquid 14.

In a modified embodiment in which the axis of the parts 2 and 3 would coincide, or be parallel to, the axis of the case body 1, the flattened wall zone 12 with its associated aperture 1a could be provided at a suitable location in the flat bottom of the case body.

What is claimed is:

1. A manometer comprising a case including a case body having a cup-shaped sheet-metal part and having an aperture and an outward protrusion with a flat wall zone surrounding the aperture, a support piece including a prismatic portion arranged within the case, and ending at a shoulder which rests on said flat wall zone, the contour of which is adapted to the outer contour of the shoulder, said support piece also including an outer portion extending from said prismatic portion at said shoulder through said aperture, an outer connecting piece having a bore and fitted in a fluid-tight manner to the outer portion of the support piece and firmly engaging said flat wall zone of the case body, a fluid-pressure measuring spring tube having a free end and an end secured to the prismatic portion of the support piece and an inner space connected with the bore of the outer connecting piece through a passageway provided in the support piece, and means arranged within the case, supported by the prismatic portion of the support piece and operatively connected to the free end of said fluid-pressure measuring spring tube, for indicating the measured fluid-pressure acting in that tube.

2. A manometer as defined in claim 1, wherein the bore of the outer connecting piece is staggered, a wider portion of same being screwed onto the outer portion of the support piece and a rim at a staggered part of the bore being in fluid-tight engagement with a conical outer surface of an extension of the outer portion of the support piece.

3. A manometer as defined in claim 1, wherein the prismatic portion of the support piece has an annular groove cut in its shoulder, and a sealing ring resting in that groove engages the flat wall zone of the case body.

4. A manometer as defined in claim 1, wherein the case comprises a sheet-metal ring set upon the rim of the cup-shaped case body, a resilient ring held partly in said sheet-metal ring and partly in the portion of the case body adjoining the rim, and a transparent window shield embedded in said resilient ring.

5. A manometer as defined in claim 1, wherein said flat wall zone is formed in the peripheral wall of the cup-shaped case body.

* * * * *